United States Patent
Domen

[15] 3,665,762
[45] May 30, 1972

[54] CALORIMETER

[72] Inventor: Steve R. Domen, Derwood, Md.

[73] Assignee: The United States of America as represented by the Secretary of Health, Education and Welfare

[22] Filed: Nov. 4, 1969

[21] Appl. No.: 873,924

[52] U.S. Cl. .........................................................73/190 R
[51] Int. Cl. ......................................................G01k 17/00
[58] Field of Search ..............................73/190; 250/83, 83.3

[56] References Cited

UNITED STATES PATENTS 3,394,258   7/1968   Schleiger.................................73/190

OTHER PUBLICATIONS

Petree et al. " A Comparison of Absorbed Dose Determination in Graphite by Cavity Ionization Measurements and by Calorimetry" in Journal of Research of NBS Vol. 71C#1 Jan-Mar. 1967 pgs. 19-27

Primary Examiner—Richard C. Queisser
Assistant Examiner—Herbert Goldstein
Attorney—Browdy and Neimark

[57] ABSTRACT

A heat loss compensated calorimeter wherein a core is surrounded by a jacket and the jacket is surrounded by a constant temperature, adiabatic or floating shield. The core and jacket have the same heat capacities, and thermistors having the same temperature coefficients are embedded in the core and jacket to compare the heat present, by means of a Wheatstone Bridge.

10 Claims, 5 Drawing Figures

Patented May 30, 1972 3,665,762

INVENTOR
STEVE R. DOMEN

BY
ATTORNEYS

CALORIMETER

The present invention relates to calorimeters and, more particularly, to aneroid comparison radiation calorimeters which are heat loss monitored compensatable so that a sample of material placed in the calorimeter can be maintained at an accurately measured and accurately controlled temperature.

It is desirable to provide for the calibrating of measuring instruments in terms of absorbed dose with mono-energetic electron and bremsstrahlung beams produced at accelerator voltages between about 1 and 50 MeV. A calorimeter provides means for measuring such absorbed dose.

In particular the present invention provides a novel calorimeter particularly suited for absorbed dose measurements since the uncertainties caused by calibrating heater leads and by temperature gradients existing in the body in which the dose is measured are of little or no importance. The calorimeter's construction permits use of an automatic heat summing Wheatstone Bridge circuit. In general, heat losses from the system are considerably reduced, resulting in smaller uncertainties due to heat loss corrections; these can be entirely ignored under certain conditions of operation.

In the use of calorimeters it is desirable to attain a high degree of accuracy for small sample determinations. This desired accuracy is impossible to attain when errors from heat leakage are introduced and there is an irregular heat transfer through the body of the sample being tested. There are other factors which militate against the desired accuracy, such as the calorimetric device having too large a heat capacity, thus not being adequately temperature-sensitive for minute quantities of energy input.

It is also desirable in the construction of a calorimeter which attains the accuracy sufficient to satisfy practical industrial requirements to avoid over-complicating the device or the procedure to the point where routine determinations would be hampered. It is thus evident that what is needed is a basic and relatively simple device which is versatile and which performs thermodynamic measurements with a high degree of accuracy.

The present invention provides a novel calorimeter in the disclosed exemplification wherein a jacket encloses a core and wherein thermodynamic tests are to be performed on both. This jacket acts as a primary heat barrier to minimize heat loss from the core and, in particular, at times to act as a heat feedback for that part of the heat lost from the core and retained in the jacket. The jacket is enclosed by a shield and spaced therefrom to define a cavity therebetween so that, preferably, an insulating vacuum may be maintained between the elements. The shield acts as a secondary heat barrier to lag out some temperature fluctuations of short duration in the air or other medium surrounding the calorimeter. If desired, a medium, which may be temperature controlled above room temperature may be provided for surrounding the shield to provide for broad beam radiation scattering when measuring absorbed dose, and this medium will at the same time provide additional stability against large fluctuations in ambient temperature. A heat input element extends into the core for calibration while both the core and the jacket have suitable temperature detecting elements, preferably thermistors, embedded in them. It is particularly convenient to make the heat capacities of the core and jacket equal; and in that case, the temperature coefficients of the two temperature detecting elements should also be equal. If there are small deviations from these requirements, the heat capacities of the core and jacket, or the sensitivities of the detecting elements in them, should be adjusted to satisfy the requirement so that, for the same heat input into the core or jacket, the detectors give the same response.

The present invention, therefore, offers a new and improved absorbed-dose calorimeter which is not only simple in design but which is easy to construct, and which at the same time is extremely accurate in its temperature measurement and heat conservation, lessening the demand for high vacuum equipment.

Accordingly, it is an object of the present invention to overcome defects in the prior art, as indicated above, and to provide for improved heat measurements in a simplified and inexpensive, yet accurate and reliable, manner.

An object of the present invention is the provision of a calorimeter for making temperature readings as a result of direct radiation of a sample.

Another object is the provision of a calorimeter for making absorbed-dose measurements.

Another object is to provide for improved calorimetric measurements regardless of the type of energy involved.

Still another object is the provision of a calorimeter which makes measurements by means of a Wheatstone Bridge.

Yet another object is the provision of a calorimeter which utilizes thermistors as the temperature detecting elements.

Another object is the provision of a calorimeter which utilizes thermistors having equal temperature coefficients.

Still another object is the provision of a calorimeter having a core and jacket of the same heat capacity.

Another object is the provision of a calorimeter having a jacket consisting of two pieces, jacket base and jacket cap, having heat capacities in the same ratio as the ratio that each receives heat from the core, such construction further insuring temperature equality.

Other objects and advantages will be apparent and a better understanding of the invention will be obtained from the following description of a possible embodiment which is described with reference to the drawing, it being understood that this embodiment is intended as merely exemplary and in no way limitative.

Figure 1:
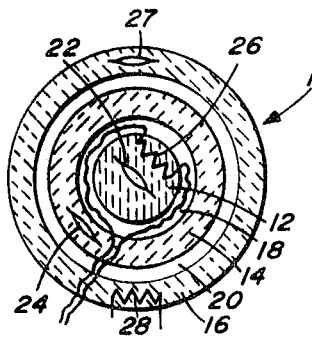
FIG. 1 is a cross-sectional schematic view of the elements of the calorimeter.

Referring now to the drawings, there is shown in FIG. 1 a calorimeter 10 having core 12 encased in a jacket 14. Surrounding the jacket 14 is a shield 16 which can be (1) isothermal, i.e., maintained at a fixed temperature, (2) floating, i.e., seeking its own temperature, or (3) adiabatic, i.e., made to follow the temperature of the jacket. If desired, a thermally regulated and isolated medium may be provided to surround the shield. Located between the core 12 and jacket 14 and between jacket 14 and shield 16 there are void spaces 18 and 20, respectively, which may be evacuated by suitable pump apparatus, not shown, to add to the insulating properties of jacket 14 and shield 16. The core, jacket, shield and medium (not shown) may each be formed of any suitable material, but are each preferably formed of graphite. Imbedded in the core material 12 and also in the jacket 14 are thermistors 22 and 24 for use in measuring the heat generated in or lost from the calorimeter, as will be described more fully hereinafter. Also imbedded in core material 12 is a heater 26, which when connected to a source of potential can be used to inject heat into the core for calibration purposes and therefore to determine the absorbed dose in the core.

The shield preferably contains an imbedded thermistor 27 and a heater 28 which aid in rapid cycling of the calorimeter and restoring the shield temperature to the initial value after each irradiation measurement and calibration run. The same recycling procedure is applied to the core and to the jacket. The bridge circuit, described below, is of such a design that the thermistor in the jacket can alternately perform a dual role as a temperature sensor and heater. A switching arrangement permits a separate observation of the core, jacket, or shield temperature. Hence, after each heating run the system is quickly overcooled by admitting air to a pressure of at least a few hundred microns of mercury and then reevacuating. Then the bodies can be separately heated to their initial values of temperature.

It is important that the heater leads in void 18, between the core and jacket, be sufficiently long so that heat conducted along the wires from the hot ends of the heater will be radiated to the core and the jacket. The heat produced by the ohmic heating in the wires will also be radiated to the core and the jacket. As will appear below, the circuit of FIG. 3 sums the temperature in both the core and the jacket so that these sources of error are reduced to a negligible value.

Figure 2:
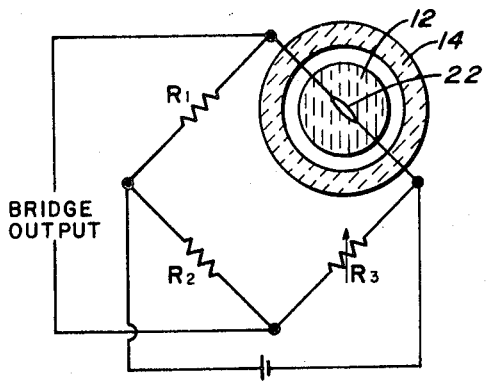
FIG. 2 shows the circuitry for measuring temperature rise in an irradiated case.

By definition a thermistor, or thermal resistor, is a bolometer that makes use of the change in resistivity of a semiconductor with change in temperature. A thermistor has a large temperature coefficient of resistance, so its resistance changes rapidly as temperature changes. Thermistors are frequently used as bolometers to measure temperatures and microwave energy. FIG. 2 shows a circuit for utilizing the thermal properties of a thermistor to measure the temperature rise in the core 12 when it has been irradiated by an external source of energy. The circuit takes the form of a balanced Wheatstone Bridge, having resistance $R_1$, $R_2$ and $R_3$ in three of its arms, and the thermistor 22 in the fourth arm. As the temperature of the core 12 rises under the influence of external radiation, the resistance of thermistor 22 changes, thus unbalancing the bridge. The amount of unbalance is preferably calibrated in degrees at the bridge output, or, as in this case, joules of energy added to the core.

Figure 5:
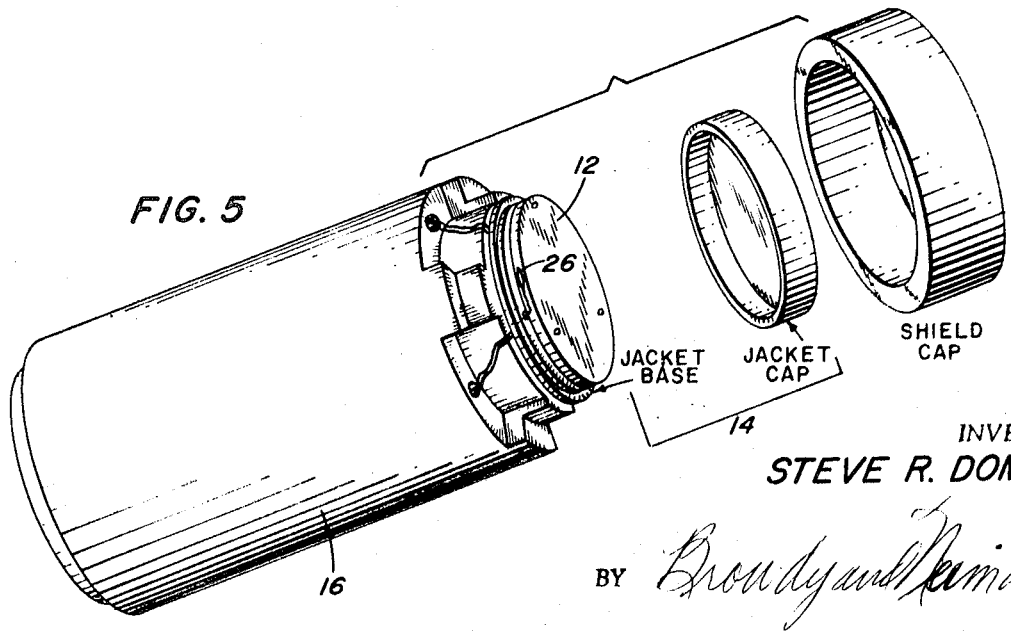
FIG. 5 is an expanded perspective view of the illustrated embodiment.

Actual construction of the calorimeter will be clear to the normally skilled artisan from the present disclosure. However, FIG. 5 shows one possible form of construction. A tubular graphite shield 16 about 6 cm long surrounds the tubular jacket, also preferably formed of graphite and consisting of a jacket base and a jacket cap, which in turn surrounds the cylindrical graphite core 12, 2 cm in diameter and 2¾ mm thick. The thermistors may be mounted within the bodies of the core and jacket base in any manner, such as by adhesive, e.g., epoxy resin. Suitable wires from the thermistors and the heater 26 pass through the annular spans between the jacket and core, and between the jacket and shield. Both the shield and the jacket base are provided with pump-out holes for evacuating the annular spaces, and for leading out the bridge thermistor and heater wires. The jacket base is supported at one end of the shield and the core is supported on the jacket base. Hence, any heat lost through the core supports during calibration and absorbed in the jacket is measured, as will be described below. A jacket cap and a shield cap are provided as shown.

In a preferred embodiment the inside surfaces of the jacket 14 facing the core 12 are provided with means to reflect radiation; for example, the inner wall of the jacket 14 may be coated with a thin layer of epoxy resin for firmly holding pieces of one-quarter mil aluminized "Mylar" (polyethylene terephthalate film). Such reflectorized film decreases the thermal radiation from the core by about a factor of ten. The surfaces of the core are preferably left bare for three reasons: (1) it is important to minimize the amount of foreign material in the pure graphite core where absorbed dose measurements are made; (2) aluminizing the surfaces of the core would gain a reduction of heat loss from the core by only an additional factor of two; and (3) the heat loss corrections are well within 1 percent because sufficient temperature rises occur in short running times for particular electron beams that are used. The heat capacity of the epoxy and aluminized "Mylar" is a small fraction of the jacket and is taken into account when making its heat capacity equal to that of the core. Similarly, the outside surfaces of the graphite jacket are preferably bare, while the inside surfaces of the shield facing the jacket are reflectorized (e.g., aluminized "Mylar"). The outside surfaces of the shield also preferably have a layer of aluminized Mylar.

Figure 3:
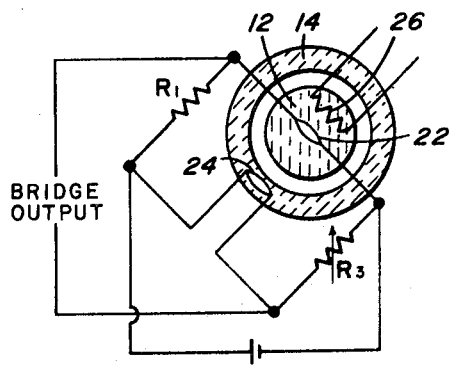
FIG. 3 shows the circuitry for measuring temperature rise during a calibration run.

When calibration of the calorimeter is required, then the circuitry of FIG. 3 is employed. The circuit here is somewhat like that of FIG. 2, except that the fixed resistor, $R_2$, is replaced by thermistor 24 of equal resistance located in jacket 14 so now the resistance in the bridge arms will vary with changes in resistance of the two thermistors rather than only one.

Figure 4:
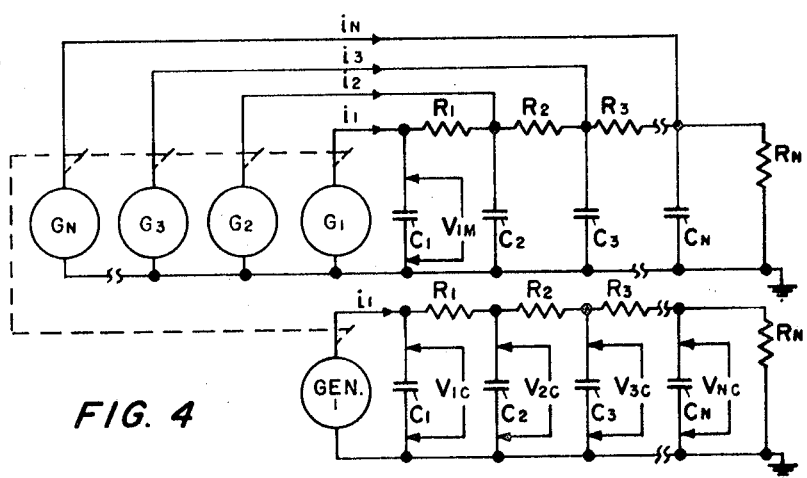
FIG. 4 shows the equivalent electrical circuit of the heat transfer functions.

An electrical analogy to the heat transfer theorem can be understood by reference to FIG. 4, where voltage, current, capacitance and reciprocal of resistance are analogous to temperature, power, heat capacity, and heat-transfer coefficient. The upper circuit represents the conditions during irradiation heating, while the lower circuit represents the conditions during an electrical calibration.

Turning now to the operation of the invention, and the heat transport theorem to support this operation, there is shown in FIG. 1 a calorimeter of the type disclosed wherein the shield 16 is assumed to be at a constant uniform temperature. Now let a uniform constant intensity beam of ionizing radiation (not shown), such as an x-ray, electron, or other beam, impinge for a time t upon the calorimeter, the core 12 and jacket 14, each being made of the same material, such as graphite, for example, and having the same heat capacity. If the dimensions of the core 12 and jacket 14 are sufficiently small, each will convert the same amount of beam energy to heat at power P for a time $t$. The initial rates of temperature rise will be the same, but because of heat loss, the jacket will reach a temperature intermediate between that of the shield and core. In this way the heating of the jacket retards heat loss from the core. A result of the heat transport theorem is that the heat loss correction, even when considerable, can be ignored provided that a constant calibrating power is applied for the same time $t$.

First, to illustrate a physical meaning of the theorem, assume that to calibrate the absorbed dose calorimeter an idealized amount of electrical energy, at the same power P, for a time $t$, is supplied to the heater 26 embedded in core 12. In this mode the core 12 loses heat to the jacket 14, the jacket loses heat to the constant temperature shield 16, but the heat retained in the jacket is measured and added to the heat measured in the core. The measurement is made by connecting the core thermistor 22 and jacket thermistor 24 in opposite arms of a Wheatstone Bridge, as shown and described for FIG. 3. Hence, for the above illustration in the absorbed-dose calorimeter, the selection of the jacket 14 as equal in heat capacity and composition to the core 12 yields what appears to be an unobvious result: during an absorbed-dose run, the heat lost from the core is equal to the heat lost from the jacket during the calibration run, resulting in identical output signals while heating and cooling. During a calibration run, the jacket enables one to "compensate" for some of the heat loss from the core by means of identical matched thermistors embedded in the jacket and core and connected in opposite arms of a Wheatstone Bridge. The term "heat loss compensated" is herein used for calorimetry in which the main heat loss from the core is registered in this manner.

In practice the calibrating power P is necessarily different from that supplied to the core and jacket during an absorbed dose run, but the time t can be kept the same. A practical result of the theorem is that the absorbed dose and calibrating energies applied to the core are in proportion to the output Wheatstone Bridge signals, uncorrected for heat losses. When the times are different, heat loss corrections must be made by the usual methods of calorimetry. They will be considerably smaller, compared to those required for a calorimeter in which a core is surrounded by a constant temperature medium. In each run the heat losses are radiated from more uniform temperature surfaces.

These features are a result of the present calorimeter construction, and are always desirable in calorimetry. They permit a simplification in the design of the core and in the practical operation of the calorimeter. To illustrate, first consider a calorimeter consisting of a core with constant temperature surroundings (isothermal mode). During radiation, let a beam produce a uniform temperature throughout the core. The usual method of calibration is to duplicate the above run as closely as possible by injecting electrical power into the core for about the same time. This usually requires that the core be made into two parts, enclosing an embedded electrical heater of fine wire somewhat uniformly distributed in a median plane. The core in the present design is of much simpler construction, consisting of a single piece, and its embedded electrical heater is a 10 mil diameter spherical thermistor. Because of the heat compensation feature of the calorimeter, a close duplication of the core's surface temperature in the two runs is no longer of importance for accuracy.

The floating shield mode, previously mentioned, is particularly effective in absorbed dose runs. The shield will be heated by the beam, thus rising in temperature, and thereby decreasing heat loss from the jacket and hence from the core. There are two advantages to this mode that should be given primary consideration in constructing an absorbed dose calorimeter. First, heat loss from the core is smaller than with a constant shield temperature, so that the measurements of smaller dose rates are made possible. Second, this mode requires no costly apparatus for temperature control of the shield, thereby simplifying the system.

If it were desirable to eliminate the jacket leakage, the shield 16 could be heated, as required, to match the jacket's temperature rise (adiabatic mode). When the radiation beam supplies power equally to the core and jacket, their initial rates of temperature rise will be the same and remain constant in this mode of operation. The shield will also be heated by the beam, requiring no initial change in electrical power to follow the jacket's temperature. No heat will be transferred between the core and jacket, so that the output signal is a measure of the dose produced in the core. A test for possible small temperature differences between them can be made by switching the thermistors to form adjacent arms of the Wheatstone Bridge circuit. The output signal would then be a measure of the temperature difference as a function of time, and a suitable correction could be applied. In a calibration run, or in any run where an unknown amount of energy to be measured is supplied directly only to the core, the jacket's temperature rise would be less than that of the core, and more uniform. The adiabatic condition thus could be more easily approximated than in calorimeters having only a jacket in which the jacket is required to follow the core in temperature. Systematic heat losses arising from improper temperature sampling could also be expected to be reduced.

It will be noted that the radiation beam runs differ from the electrical calibration runs in the following respect: in the radiation-beam runs both core and jacket are heated directly, while in the electrical calibration runs only the core is heated directly. Thus, the practical loss of heat from the core will differ in the two cases. The identity previously mentioned concerning heat transfer among the parts of a calorimeter shows that for uniform temperatures where Newton's law of cooling is a good approximation, $$T_{1M}(t) \quad T_{1C}(t) + T_{2C}(t) \quad (1)$$

for all values of $(t)$ where $T_{1M}(t)$ is the temperature rise of the core at time $(t)$ during an irradiation measurement run which delivers a power $P(t)$ to the core and $P(t)$ to the jacket; $T_{1C}(t)$ is the temperature rise of the core at time $(t)$ during a calibration run in which electrical power $P(t)$ is delivered to the core; $T_{2C}(t)$ is the temperature rise of the jacket at time $(t)$ during the electrical calibration runs (some heat from the core warms the jacket). Equation (1) establishes the necessary equivalence between the irradiation runs and the calibration runs.

If there are N-1 jackets each having a heat capacity equal to that of the core, and each equally convert power from the radiation beam into heat, then, $$T_{1M}(t) \quad T_{1C}(t) + T_{2C}(t) \ldots T_{NC}(t). \quad (2)$$

More generally, for a core surrounded by N-1 thermally isolated jackets, $$T_{1M} \quad T_{1C} + \alpha_2 T_{2C} + \alpha_3 T_{3C} + \ldots + \alpha_N T_{NC},$$

if the same schedule of power, $P(t)$, is applied to the core during a calibration run and a measurement run, and if $\alpha_2 P(t)$, $\alpha_3 P(t) \ldots \alpha_N P(t)$ are the schedules of power applied during a measurement run to the first jacket, the second jacket, etc., respectively, where $\alpha_2, \alpha_3, \ldots, \alpha_N$ are constants. This expression is independent of the possibly different heat capacities of the core and jackets, and also independent of the time variation of $P(t)$, whether $P(t)$ acts as a heater or as a refrigerator.

When the power directly delivered to the core in an absorbed dose run, $P_M(t)$, is different from the power delivered to the core in a calibration run, $P_C(t)$, then the right member of (1), (2) and (3) must be multiplied by the power ratio, $P_M(t)/PAC(t)$. The powers are understood to have the same variation with time but differ in amplitude.

TEMPERATURE VS. TIME SOLUTIONS

The temperature vs. time of the core and jacket for the general case was solved for (1) the constant temperature and the adiabatic mode, (2) the measurement and the calibration run, and (3) the heating and cooling cycle. Let $C_1$ = the heat capacity of the core;
$C_2$ = the heat capacity of the jacket;
$T_1$ = the temperature change from equilibrium of the core for any run;
$T_2$ = the temperature change from equilibrium of the jacket for any run;
$K_1$ = the heat transfer coefficient between the core and jacket;
$K_2$ = the heat transfer coefficient between the jacket and the constant temperature shield ( = 0 for the adiabatic mode);
$P_1$ = the power applied directly to the core; and
$P_2$ = the power applied directly to the jacket.

The temperatures are governed by the following differential equations of heat flow:

$$C_1 dT_1 = P_1 dt - K_1(T_1 - T_2)dt$$

and $$C_2 dT_2 = P_2 dt + K_1(T_1 - T_2)dt - K_2 T_2 dt.$$

The complete solutions for the constant temperature mode for heating and cooling are:

$$T_1 = \frac{\left|\frac{1}{C_1}\left[P_1 - K_1(T_{01} - T_{02}) - r_2\left[T_{01} - \left(\frac{P_1 + P_2}{K_2} + \frac{P_1}{K_1}\right)\right]\right]\right| e^{r_1 t}}{r_1 - r_2} \ldots$$

$$- \frac{\left|\frac{1}{C_1}\left[P_1 - K_1(T_{01} - T_{02}) - r_1\left[T_{01} - \left(\frac{P_1 + P_2}{K_2} + \frac{P_1}{K_1}\right)\right]\right]\right| e^{r_2 t}}{r_1 - r_2} \ldots$$

$$+ \frac{P_1 + P_2}{K_2} + \frac{P_1}{K_1}$$

and $$T_2 = \frac{\left|\frac{1}{C_2}[P_2 + K_1 T_{01} - T_{02}(K_1 + K_2)] - r_2\left[T_{02} - \frac{P_1 + P_2}{K_2}\right]\right| e^{r_1 t}}{r_1 - r_2} \ldots$$

$$- \frac{\left|\frac{1}{C_2}[P_2 + K_1 T_{01} - T_{02}(K_1 + K_2)] - r_1\left[T_{02} - \frac{P_1 + P_2}{K_2}\right]\right| e^{r_2 t}}{r_1 - r_2} \ldots$$

$$+ \frac{P_1 + P_2}{K_2},$$

where $T_{01}$ and $T_{02}$ are the initial temperatures of the core and jacket, respectively, at the beginning of the heating or cooling cycle, $r_1$ and $r_2$ are the roots of a complementary function and are given below;

$$r_1 = \frac{-b + \sqrt{b^2 - 4c}}{2}$$

and $$r_2 = \frac{-b - \sqrt{b^2 - 4c}}{2},$$

where, in terms of the calorimeter parameter, $$b = \frac{K_1}{C_1} + \frac{K_1}{C_2} + \frac{K_2}{C_2}$$

and $$c = \frac{K_1 K_2}{C_1 C_2}.$$

In a calibration run, for example, starting at equilibrium in the constant temperature mode, $P_2 = 0$, $T_{o_1} = 0$, and $T_{o_2} = 0$. Substituting these values in the above formulas gives $T_1 = T_{1c}$, and $T_2 = T_{2c}$ as a function of time. Their final values at the termination of the heating run become the initial values for the beginning of the cooling run, where $P_1 = 0$ and $P_2 = 0$.

The complete solutions for the adiabatic mode for heating are $$T_1 = \frac{1}{r_1}\left|\frac{P_1 + P_2}{C_1 + C_2} - \frac{1}{C_1}[P_1 - K_1(T_{01} - T_{02})]\right|(1 - e^{-r_1 t})$$

$$+ \frac{P_1 + P_2}{C_1 + C_2} t + T_{01}$$

and $$T_2 = \frac{1}{r_1}\left|\frac{P_1 + P_2}{C_1 + C_2} - \frac{1}{C_2}[P_2 + K_1(T_{01} - T_{02})]\right|(1 - e^{-r_1 t})$$

$$+ \frac{P_1 + P_2}{C_1 + C_2} t + T_{02},$$

where $$r_1 = -K_1\left(\frac{1}{C_1} + \frac{1}{C_2}\right).$$

An electrical analogy to the heat transport theorem can be understood by reference to FIG. 4, where voltage, current, capacitance, and reciprocal of resistance are analogous to temperature, power, heat capacity, and heat transfer coefficient. The upper circuit represents the conditions during irradiation heating, while the lower circuit represents the conditions during an electrical calibration. Let $i_1 = i_2 = i_3 \ldots i_N$. If the voltages are all zero initially, and if the ganged switches are simultaneously operated in any manner, then:

$$V_{1M}(t) = \sum_{n=1}^{N} V_{nC}(t) \quad (4)$$

for all ($t$) and for any arbitrary $i(t)$.

More generally, when the currents are unequal, but have the same variation with time, i.e., $i(t)$ is the current from $G_1$
$\alpha_2 i(t)$ is the current from $G_2$
.............................
$\alpha_N i(t)$ is the current from $G_N$, then $$V_{1M}(t) \quad V_{1C}(t) + \alpha_2 V_{2C}(t) + \ldots \alpha_N V_{NC}(t) \quad (5)$$

for all ($t$), regardless of the values of the capacitors and resistors. When the current $i_M(t)$ from $G_1$ in the top circuit of FIG. 4 differs in amplitude from $i_C(t)$, the current from $G_1$ in the bottom circuit, then the right member of (4) and (5) must be multiplied by a constant equal to the ratio, $i_M(t)/i_C(t)$.

The following example, offered as an illustration, compares the performance of the present calorimeter construction to a calorimeter of conventional design for other than absorbed dose measurements, such as the determination of the power of a radioactive sample. The following conditions will be assumed. The shield of the heat loss compensated calorimeter will be assumed fixed in temperature. The conventional design is taken to consist of a core in constant temperature surroundings. In each case the radioactive sample is placed in the core wherein it dissipates its energy and produces a rising temperature. The jacket rises in temperature because of thermal radiation from the core. To measure the power in a calorimeter of conventional design, the experimenter uses a particular size of tungsten core having a heat capacity C. The core contains two embedded thermistors located in opposite arms of a Wheatstone Bridge. In the heat loss compensated calorimeter, the core and jacket each have a heat capacity of one-half C and contain an embedded thermistor. The power of the source in each case is proportional to the ultimate bridge signal reached after a sufficiently long time. This signal is always desired to be as large as possible and it is interesting to know about what to expect with these two different constructions.

Although initially the rates of the output signal rise will be the same in both cases, the signals will always be greater during the run with the heat loss compensated calorimeter. Calculations of temperature vs. time were made for the jacket and each core by assuming a particular geometry for those bodies. The calculation showed that the ultimate signal with the construction of the present invention was 2½ times greater than that of the conventional design. Various geometries studied showed that the factor varies, depending on geometry and heat transfer coefficients. It seems to remain greater even when the heat capacity in the new construction is increased to twice that of the conventional design.

Suppose that the core and jacket each had a heat capacity of C and the core in the conventional design remained the same, having a heat capacity C. The initial rate of temperature rise for the new design will be one-half that of the conventional design. However, the ultimate calculated signal for the particular case studied was still greater, 1½ times that of the conventional design. Doubling the mass of the system would also absorb a greater fraction of the source's energy.

In the case of radiation so penetrating that it is incompletely absorbed in the core of heat capacity C, such a doubling would result in more nearly complete absorption, and thus an advantage greater than the above-mentioned factor of 1½.

From the above description of the structure and operation of this device, it is apparent that the invention offers considerable improvement over prior art calorimeters in that there is disclosed an absorbed dose calorimeter which is simple to construct and one which is accurate in its temperature measurements. The concept of having the core and jacket constructed of the same material so as to have the same heat capacity, and of having thermistors with the same temperature coefficients produce results never before obtained in the calorimeter art.

Although there have been described specific calorimeters in accordance with the invention, it will be appreciated that the invention is not limited thereto. Accordingly, any and all modifications, variations or equivalent arrangements falling within the scope of the annexed claims should be considered to be a part of the invention.

What is claimed is:

1. A calorimeter comprising
   an internal body of given heat capacity for absorbing radiation energy from a sample;
   a jacket surrounding said body and having the same heat capacity as said body;
   a shield surrounding said jacket;
   cavities between the body and the jacket, and between the jacket and the shield;
   first temperature responsive means imbedded in said body;
   second temperature responsive means imbedded in said jacket; and
   means to sum the outputs of said temperature responsive means.

2. The device of claim 1 wherein said body, said jacket and said shield are all made of the same material.

3. The device of claim 2 wherein said body comprises a core for absorbing samples to be tested; said cavities define zones of insulating vacuum; said core comprises calibrating means imbedded therein; and further comprising temperature responsive means and heater means imbedded in said shield.

4. The device of claim 3 wherein the first and second temperature responsive means are thermistors.

5. The device of claim 4 wherein said thermistors have equal temperature coefficients.

6. The device of claim 5 wherein said calibrating means consist of a heating element that is a miniature thermistor for inserting energy into said core.

7. The device of claim 6 wherein said shield is a constant temperature, adiabatic, or floating shield.

8. The device of claim 7 wherein said core, said jacket, and said shield are formed of graphite.

9. The device of claim 8 wherein the heat capacity of the jacket base and the heat capacity of the jacket cap are constructed to be in the same ratio that they receive heat from the core.

10. The device of claim 9 wherein the leads from the heater are of sufficient length to radiate their excess heat in the void between the core and the jacket.

* * * * *